United States Patent [19]

Richerson et al.

[11] 4,040,845

[45] Aug. 9, 1977

[54] CERAMIC COMPOSITION AND CRUCIBLES AND MOLDS FORMED THEREFROM

[75] Inventors: David W. Richerson; Donald R. Schuyler, II, both of Tempe, Ariz.

[73] Assignee: The Garrett Corporation, Los Angeles, Calif.

[21] Appl. No.: 663,641

[22] Filed: Mar. 4, 1976

[51] Int. Cl.$^2$ .......................... B28B 7/34; C04B 35/50
[52] U.S. Cl. ..................................... 106/38.9; 106/55; 106/73.2
[58] Field of Search ....................... 106/73.2, 38.9, 55; 75/1; 164/41

[56] References Cited

U.S. PATENT DOCUMENTS

| | | | |
|---|---|---|---|
| 3,588,573 | 6/1971 | Chen et al. | 106/73.2 |
| 3,682,766 | 8/1972 | Maher | 106/73.2 |

Primary Examiner—Winston A. Douglas
Assistant Examiner—Mark Bell
Attorney, Agent, or Firm—Herschel C. Omohundro; Ronald L. Grudziecki; James W. McFarland

[57] ABSTRACT

This ceramic composition is produced from a mixture of yttrium oxide and heavy rare earth oxides having an atomic number of from 64–71 in selected proportions for the construction of crucibles and the lining of molds employed in making castings of reactive metals, such as titanium and alloys thereof. The elements utilized in the composition impart a minimum of contamination to the molten metal during the melting and casting phases and are produced from an ore with only the refinement steps necessary so as to secure maximum economy and yet insure the production of castings of the highest quality.

10 Claims, No Drawings

CERAMIC COMPOSITION AND CRUCIBLES AND MOLDS FORMED THEREFROM

The invention herein described was made in the course of or under a contract with the Department of the Air Force.

BACKGROUND OF THE INVENTION

This invention relates generally to metallurgy and ceramics and more particularly to the development of containers for the inductive melting of titanium and titanium alloys and the casting of articles from the molten metals.

Production of titanium castings at the present time is marked by high reject rates and significant component rework due to use of certain melting techniques, the use of particular types of equipment, the failure to secure uniform temperatures in the molten metal prior to pouring, and high reactivity between the molten metal and the materials of the crucibles and molds. Prior to this invention, the production of titanium castings in the United States has been limited to a few foundries all of which use skull melting in water cooled copper crucibles by the consumable and/or non-consumable electrode method. In the casting process, use may be made of ceramic investment molds with a nonreactive coating such as tungsten powder or graphite or molds composed of rammed graphite. These methods result in the above-noted objections which the present invention seeks to avoid.

SUMMARY

This invention relates to the provision of a composition from which crucibles and molds may be constructed to permit the use of induction heating without requiring the crucible to be cooled during the melting operation.

An object of the invention is to provide a composition and crucibles and molds formed therein which will secure better control of the melt temperature and fewer casting defects, the composition being such that excessive reaction of the molten titanium and alloys therewith will be substantially reduced or completely eliminated.

Another object of the invention is to provide a composition for use in forming crucibles and molds composed of a plurality of elements a certain one of which has a low reactivity to the molten titanium and others which, while perhaps being more reactive, appear, when combined with the first, to solve the reaction problem and are more economical to secure.

Still another object of the invention is to provide a composition for use in forming crucibles and molds having a major weight percent of yttrium and the balance of rare earths all refined to the degree of purity necessary to give the desired results but not to the extent to make the cost thereof excessive.

A still further object of the invention is to provide a composition from which crucibles and molds for melting and casting titanium and alloys thereof may be formed, the composition having between 58 and 63 weight percent of yttrium oxide and a high proportion of heavy rare earth oxides from the group including dysprosium oxide, ytterbium oxide, erbium oxide, gadolinium oxide, terbium oxide, holmium oxide, thulium oxide and lutetium oxide.

Other objects of the invention will be apparent from or suggested by the following description of one embodiment of the invention selected as an example to teach the invention.

DESCRIPTION OF THE INVENTION

The invention may be carried out by preparing a composition consisting of powders having the lowest reactivity to molten titanium and/or alloys thereof. It was found that high purity yttrium oxide and yttrium oxide with a low percentage of titanium provided the lowest reactivity systems but the raw material cost was practically prohibitive. It was further discovered that yttrium oxide combined with heavy rate earth oxides provided a composition which while perhaps not quite as low in reactivity as the first composition suggested, gave satisfactory reactivity results and cost substantially less.

The ingredients for the composition may be secured by treating xenotime or other suitable ores with a sulphate solution then precipitating it into an oxalate which is then fired to convert it to oxides of the elements contained in the raw ore. The average particle size of this powder as precipitated is under 10 microns. A typical composition range obtained by such treatment is as follows:

| Compound | Weight % |
| --- | --- |
| $Y_2O_3$ | 58–63 |
| $Dy_2O_3$ | 5–12 |
| $Yb_2O_3$ | 5–7 |
| $Er_2O_3$ | 5–7 |
| $Gd_2O_3$ | 3–6 |
| $CeO_2$ | 1–5 |
| $Eu_2O_3$ | 1–3 |
| $La_2O_3$ | 1–6 |
| $Sm_2O_3$ | 1–2 |
| $Nd_2O_3$ | 1–2 |
| $Pr_2O_3$ | 0–1 |
| Other rare earth oxides | 1 |
| Non-rare earth (primarily CaO, $Al_2O_3$, & $TiO_2$ | 6 max. |

The non-rare earth oxide content of the purified powder may be reduced by subjecting the product of the first treatment to the additional steps of applying a nitrate solution, precipitating the material into an oxalate, and firing the same to oxidize it. The non-rare earth oxides remaining will then be less than 0.2 weight percent.

After the powdered composition has been procured a crucible may be formed therefrom by compacting a quantity without a binder into the crucible configuration by standard cold isostatic pressing at 20,000 psi. The crucible is then air baked at 400° F for one hour or more to remove all moisture. Following the air baking treatment the crucible is loaded into a kiln from which potential contaminating material has been eliminated by pre-firing the kiln and kiln hardware in vacuum at 1700° C or higher and then cooling. After the crucible is disposed in the kiln the latter is evacuated and fired up to 600° C. Argon gas is then introduced and the temperature increased to and maintained at 1650° C for three hours. After a suitable cooling period the crucible is then ready for titanium or alloy melting operation. Crucibles prepared from the described composition were free from cracks and found to be of proper density. Titanium-beryllium alloys melted in such crucibles at temperatures of 2800° F or higher were found to have oxygen increases in weight percent of between 0.49 and 0.56 or an average of 0.52 which has been adjudged satisfactory. It is to be noted that with the crucibles formed from the composition of the invention in the method above-described the melting operation can utilize induction heating and no cooling of the crucible during such operation is required. A more uniform better controlled melt temperature is secured than with other melting techniques and fewer casting defects result.

The composition of the invention may be employed in titanium casting molds through the use of the "lost wax" method. In following such method a wax form having the shape of the desired casting is prepared and dipped in a slurry composed of the yttrium rare earth mixed oxide powder and suitable binder. After dipping, the slurry is dried such operation being assisted by dusting the coated wax form with the dry composition. The dipping and drying steps may be repeated as many times as necessary to coat the form to the desired thickness. When this stage is reached a reinforcing mold body is formed around the coated wax body by adding conventional ceramic mold-forming material. To complete the mold the wax form is melted and removed and the mold is then ready to receive the molten titanium or alloy. It is within the concept of the invention to bake the formed mold before use for a casting operation. The mold surfaces exposed to the molten metal will obviously consist of the composition of the invention and a minimum degree of contamination of the molten metal will result.

The castings formed in molds produced in the described manner with the inner liner of the composition defined herein will have significantly fewer casting defects, they will possess the required ductility and other mechanical properties, and the cost of producing them will be at a practical minimum.

Other heavy rare earth mixed oxides which may be used in the composition include terbium, holmium, thulium, and lutetium.

We claim:

1. A ceramic composition for use in constructing crucibles and molds used in reactive metal casting consisting essentially of a mixture of a major amount of yttrium oxide and a minor amount of heavy rare earth mixed oxides consisting essentially of dysprosium oxide, ytterbium oxide, erbium oxide, gadolinium oxide, terbium oxide, holmium oxide, thulium oxide and lutetium oxide.

2. The ceramic composition of claim 1 in which the yttrium oxide constitutes between 58 and 63 weight percent of the mixture.

3. The ceramic composition of claim 1 in which the heavy rare earth mixed oxides constitutes between 15 and 26 weight percent of the mixture.

4. The ceramic composition of claim 1 in which the yttrium oxide constitutes between 58 and 63 weight percent of the mixture and the heavy rare earth mixed oxides constitutes between 15 and 26 weight percent of the mixture and the balance constitutes light rare earth oxides and non-rare earth oxides.

5. The ceramic composition of claim 1 in which the yttrium oxide constitutes between 58 and 63 weight percent of the mixture and the heavy rare earth mixed oxides include $Dy_2O_3$ 5 to 12 weight percent, $Yb_2O_3$ 5 to 7 weight percent, $Er_2O_3$ 5 to 7 weight percent, $Gd_2O_3$ 3 to 6 weight percent, and the balance consists of other rare earth oxides and non-rare earth oxides not in excess of 30 weight percent.

6. The ceramic composition for constructing crucibles and molds used in reactive metal castings of claim 1 wherein the said mixture of yttrium oxide and heavy rare earth metal oxides is obtained from refined xenotime ore.

7. A crucible for use in melting reactive metals comprising a body consisting essentially of a mixture of a major amount of yttrium oxide and a minor amount of heavy rare earth mixed oxides consisting essentially of dysprosium oxide, ytterbium oxide, erbium oxide, gadolinium oxide, terbium oxide, holmium oxide, thulium oxide and lutetium oxide.

8. The crucible of claim 7 in which the yttrium oxide constitutes between 58 and 63 weight percent of the mixture from which the body is formed.

9. The crucible of claim 8 in which the rare earth mixed oxides constitute between 15 and 26 weight percent of the mixture from which the body is formed.

10. The crucible of claim 7 further including 5 to 12 weight percent dysprosium oxide, 5 to 7 weight percent ytterbium oxide, 5 to 7 weight percent erbium oxide and 3 to 6 weight percent gadolinium oxide.

* * * * *